(12) United States Patent
Rabhi

(10) Patent No.: US 10,202,967 B2
(45) Date of Patent: Feb. 12, 2019

(54) HIGH-PRESSURE ROTATING SEALING COUPLING WITH CONTINUOUS EXPANDABLE RING

(71) Applicant: Vianney Rabhi, Lyon (FR)

(72) Inventor: Vianney Rabhi, Lyon (FR)

( * ) Notice: Subject to any disclaimer, the term of this patent is extended or adjusted under 35 U.S.C. 154(b) by 741 days.

(21) Appl. No.: 14/731,836

(22) Filed: Jun. 5, 2015

(65) Prior Publication Data
US 2015/0354549 A1 Dec. 10, 2015

Related U.S. Application Data

(60) Provisional application No. 62/011,727, filed on Jun. 13, 2014.

(30) Foreign Application Priority Data

Jun. 6, 2014 (FR) ..................... 14 55195

(51) Int. Cl.
| | |
|---|---|
| *F16J 15/34* | (2006.01) |
| *F16L 27/10* | (2006.01) |
| *F16L 17/02* | (2006.01) |
| *F16L 27/08* | (2006.01) |
| *F16D 3/84* | (2006.01) |
| *F04B 9/10* | (2006.01) |
| *F16L 21/035* | (2006.01) |

(52) U.S. Cl.
CPC ................. *F04B 9/10* (2013.01); *F16D 3/84* (2013.01); *F16L 17/02* (2013.01); *F16L 21/035* (2013.01); *F16L 27/0808* (2013.01); *F16L 27/1017* (2013.01); *F16D 2300/08* (2013.01); *F16J 15/34* (2013.01)

(58) Field of Classification Search
CPC .......... F16J 15/002; F16J 15/164; F16J 15/34; F16J 15/441; F16D 2300/08; F16D 3/84; F16L 27/0808; F16L 27/1017; F16L 17/02
See application file for complete search history.

(56) References Cited

U.S. PATENT DOCUMENTS

| | | | | |
|---|---|---|---|---|
| 2,780,950 A | * | 2/1957 | Province ................. | E21B 19/16 417/15 |
| 3,915,460 A | * | 10/1975 | Kramer ................... | F16J 15/002 277/618 |
| 5,617,879 A | * | 4/1997 | Kubala ................... | F16J 15/164 277/398 |

(Continued)

*Primary Examiner* — Nicholas L Foster
(74) *Attorney, Agent, or Firm* — Young & Thompson

(57) ABSTRACT

A high-pressure rotating sealing coupling with continuous expandable ring (1) including a male hydraulic connector (2) rotating in a female hydraulic connector (4), the connectors (2, 4) including an inner duct leading into a communication chamber (10), a non-expandable sealing ring (42) being mounted freely about the male hydraulic connector (2) and being accommodated with little play in the female hydraulic connector (4), while a non-expandable ring spring (20) tends to draw the sealing ring (42) close to a ring annular bearing shoulder (14) connected to the male hydraulic connector (2) and to axially compress a continuous expandable ring (13) inserted axially between the non-expandable sealing ring (42) and the ring annular bearing shoulder (14) and having an expandable ring inner cylindrical face (15) placed in communication with the communication chamber (10).

13 Claims, 8 Drawing Sheets

(56) References Cited

U.S. PATENT DOCUMENTS

| | | | | |
|---|---|---|---|---|
| 5,669,636 | A * | 9/1997 | Kubala | B23Q 11/1015 |
| | | | | 285/281 |
| 6,918,592 | B2 * | 7/2005 | Feigl | F16J 15/3452 |
| | | | | 277/370 |
| 8,047,579 | B2 * | 11/2011 | Taillon | F16L 27/0812 |
| | | | | 285/280 |
| 8,876,116 | B2 * | 11/2014 | Hattori | F16J 15/3272 |
| | | | | 277/496 |
| 9,719,486 | B2 * | 8/2017 | Kimura | F16D 25/12 |
| 2003/0122315 | A1 * | 7/2003 | Feigl | F16J 15/3452 |
| | | | | 277/377 |
| 2014/0035237 | A1 * | 2/2014 | Hattori | F16J 15/3272 |
| | | | | 277/544 |
| 2014/0223897 | A1 * | 8/2014 | Kimura | F16D 25/12 |
| | | | | 60/435 |
| 2015/0247604 | A1 * | 9/2015 | McKinzie | F16D 1/101 |
| | | | | 403/34 |
| 2017/0184009 | A1 * | 6/2017 | Vianney | F01P 3/06 |
| 2018/0245583 | A1 * | 8/2018 | Rabhi | F04B 53/143 |

\* cited by examiner

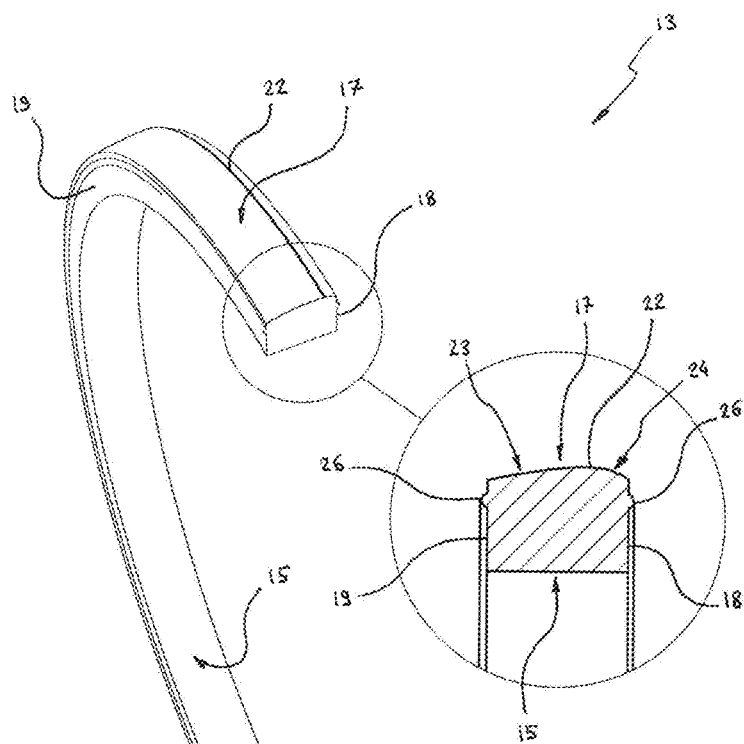
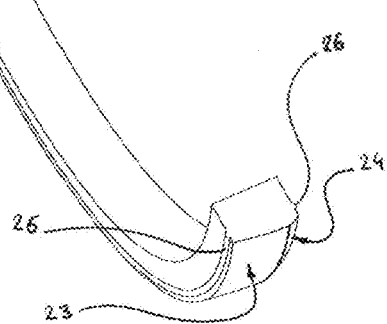
FIG.5

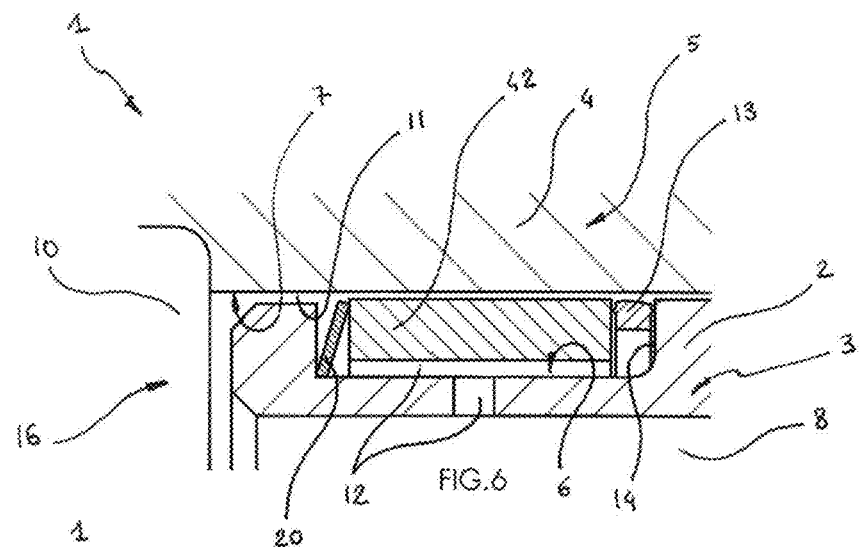
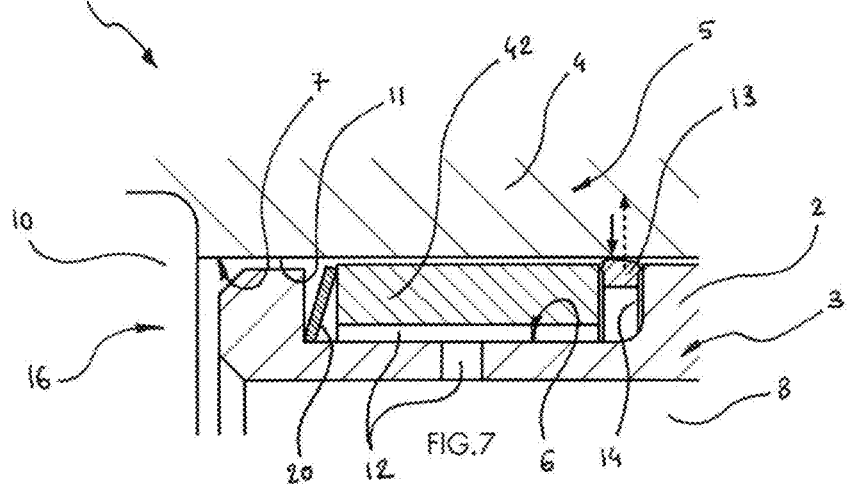
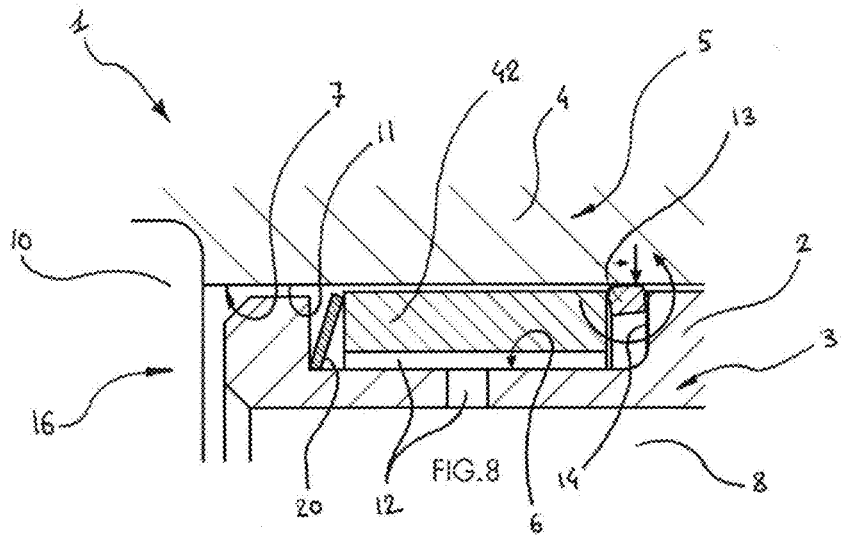

HIGH-PRESSURE ROTATING SEALING COUPLING WITH CONTINUOUS EXPANDABLE RING

FIELD OF THE INVENTION

The present invention relates to a high-pressure rotating sealing coupling with continuous expandable ring.

BACKGROUND OF THE INVENTION

Numerous applications require the provision of a seal between two elements that rotate relative to one another and between which it must be possible to establish one or more highly pressurized hydraulic fluid or gaseous flows via ducts arranged accordingly within each of said elements.

One application lies, for example, in feeding hydraulic fluid—from a stator—to cylinders arranged in the rotor of a hydraulic pump having high-pressure rotating pistons. With regard to said application and in accordance with a particular embodiment, the same rotating sealing coupling may have an inflow duct and an outflow duct in order to allow said fluid to enter said rotor at low pressure then to leave said rotor at high pressure by the same aforesaid coupling.

By way of example, a rotating sealing coupling can be used in certain hydraulic clutches, said coupling having only a single duct, which ensures both the inflow and the outflow of the hydraulic fluid.

Lastly, numerous industrial and domestic applications require the implementation of one or more rotating couplings in the high-pressure field, such as those sold by the company "Duff-Norton".

The seal of these couplings is most often ensured by a contact pressure provided between the elements rotating relative to one another, moreover by means of materials that are resistant to abrasion and known to have a reduced coefficient of friction, such as carbon graphite, ceramic, tungsten carbide or polytetrafluoroethylene, referred to as "PTFE" or "Teflon". Said materials are selected in particular under consideration of the fluid to be sealed, depending on whether this is liquid or gaseous, and depending on the degree of corrosivity of said fluid.

Since said materials are generally subjected to high contact pressures and to elevated sliding speeds, their service life is limited to the point that it may be necessary to change them regularly and that their speed of rotation is limited, as is their service pressure, which rarely exceeds 1000 bar.

It is thus clear that it is difficult to design and provide rotating sealing couplings operating in the field of very high pressures (of approximately 1000 bar or up to 2000 bar and more) which are sufficiently tight and durable so as to avoid maintenance, and which can operate at high speeds of rotation whilst remaining compact, economical and poor dissipaters of frictional energy.

It is noted that various applications will experience a significant increase in efficacy by such couplings, such as the hydraulic pump/motor with fixed or variable cylinder forming the basis of patent application no. FR 1354562 dated 22 May 2013 and filed by the applicant.

SUMMARY OF THE INVENTION

In order to solve this problem associated with the design, the provision, the durability and the functional and energy efficiency of rotating sealing couplings, it is proposed by the high-pressure rotating sealing coupling with continuous expandable ring according to the invention that, in accordance with a particular embodiment:

with the same frictional losses, the leakage flows remaining between the aspiration ducts and the delivery ducts of some hydraulic pumps are reduced, as are the leakage flows remaining between said ducts and the rotating cylinders, which said pumps may have;

with the same seal level, the frictional losses generated by the rotating couplings making it possible to connect the fixed aspiration ducts and the fixed delivery ducts with the rotating cylinders, which the hydraulic pumps generally have, are reduced;

As a result, the high-pressure rotating sealing coupling with continuous expandable ring according to the invention makes it possible in particular:

to contribute to the provision of hydraulic pumps having a high volumetric and energy yield;

to allow the design and manufacture of hydraulic pumps that can favorably form, with other components, a hydraulic hybrid transmission with high energy yield intended for the propulsion of motor vehicles;

to potentially improve the functional and/or energy efficiency of any machine or device requiring a high-pressure rotating sealing coupling.

In addition, the high-pressure rotating sealing coupling with continuous expandable ring according to the invention has a low cost price, the manufacture of said coupling not requiring any complex methods or costly materials. Said coupling is also intended to offer great robustness and a long service life and to operate in the field of high hydraulic pressures. Said coupling is also applicable to any hydraulic pump with fixed or variable cylinder, whether or not said pump in particular is a vane pump, an axial piston pump, a radial piston pump, a rotating cylinder pump and whatever the liquid, gaseous or semi-liquid fluid with which said pump operates.

The other features of the present invention have been described in the description and in the secondary claims dependent directly or indirectly on the main claim.

The high-pressure rotating sealing coupling with continuous expandable ring according to the present invention comprises:

at least one male hydraulic connector forming an integral part of a male supply body and a female hydraulic connector, which forms an integral part of a female supply body, said connectors being coaxial whilst the male hydraulic connector is accommodated within the female hydraulic connector and can rotate relative to the latter along a longitudinal axis common to the two aforesaid connectors, while the male hydraulic connector has a male connection face which faces a female connection face located on the female hydraulic connector, said connection faces being shapes of revolution in principle;

at least one male connector internal fluid duct arranged inside the male hydraulic connector, in which duct a fluid can circulate and of which one of the ends leads into a communication chamber arranged in the female supply body and/or the male supply body;

at least one female connector internal fluid duct arranged inside the female hydraulic connector, in which duct the fluid can circulate and of which one of the ends leads into the communication chamber;

at least one female cylindrical sealing section arranged in the female connection face and/or a male cylindrical sealing section arranged on the male connection face;

at least one non-expandable sealing ring mounted around the male hydraulic connector and which can slide along the latter, said ring being accommodated with little play in the cylindrical female sealing section, and/or at least one non-expandable sealing ring accommodated in the female hydraulic connector and which can move in translation longitudinally within the latter, said ring being mounted with little play around the cylindrical male sealing section;

at least one continuous expandable ring of continuous annular form, inserted axially between the non-expandable sealing ring and a ring annular bearing shoulder arranged or connected on the male connection face or on the female connection face, said continuous ring comprising either an expandable ring inner cylindrical face that can be subjected to the pressure of the fluid contained in the communication chamber via a pressure transmission channel such that an expandable ring outer cylindrical face located on said continuous ring comes into contact over the entire outer circumference thereof with the cylindrical female sealing section, or an expandable ring outer cylindrical face that can be subjected to the pressure of the fluid contained in the communication chamber via a pressure transmission channel such that an expandable ring inner cylindrical face located on said continuous ring comes into contact over the entire inner circumference thereof with the cylindrical male sealing section, said continuous expandable ring having an axial face on the non-expandable ring side held directly or indirectly in tight contact with the non-expandable sealing ring, and an axial face on the bearing shoulder side held directly or indirectly in tight contact with the ring annular bearing shoulder;

at least one non-expandable ring spring, which tends to draw the non-expandable sealing ring close to the ring annular bearing shoulder and to axially compress the continuous expandable ring.

The high-pressure rotating sealing coupling with continuous expandable ring according to the present invention comprises an axial length portion of the expandable ring inner cylindrical face closer to the ring annular bearing shoulder that on average has a diameter smaller than the axial length portion of said cylindrical face closer to the non-expandable sealing ring, whereas the expandable ring outer cylindrical face remains for its part approximately with the same diameter over the entire axial length thereof.

The high-pressure rotating sealing coupling with continuous expandable ring according to the present invention comprises an axial length portion of the expandable ring outer cylindrical face closer to the ring annular bearing shoulder that on average has a diameter greater than the axial length portion of said cylindrical face closer to the non-expandable sealing ring, whereas the expandable ring inner cylindrical face remains for its part approximately with the same diameter over the entire axial length thereof.

The high-pressure rotating sealing coupling with continuous expandable ring according to the present invention comprises an outer circumferential contact line, which is arranged in a protruding manner on the expandable ring outer cylindrical face, said line being eccentric over the axial length of the continuous expandable ring in the direction of the non-expandable sealing ring, such that a long slope of gradual incline is formed from said line oriented in the direction of the ring annular bearing shoulder, whereas a short slope of steep incline is formed from said line oriented in the direction of the non-expandable sealing ring.

The high-pressure rotating sealing coupling with continuous expandable ring according to the present invention comprises an inner circumferential contact line, which is arranged in a protruding manner on the expandable ring inner cylindrical face, said line being eccentric over the axial length of the continuous expandable bring in the direction of the non-expandable sealing ring, such that a long slope of gradual incline is formed from said line oriented in the direction of the ring annular bearing shoulder, whereas a short slope of steep incline is formed from said line oriented in the direction of the non-expandable sealing ring.

The high-pressure rotating sealing coupling with continuous expandable ring according to the present invention comprises an axial face on the non-expandable ring side and/or an axial face on the bearing shoulder side, which has an axial annular protrusion.

The high-pressure rotating sealing coupling with continuous expandable ring according to the present invention comprises a female supply body or a male supply body, which forms a hydraulic pump rotor for a hydraulic piston pump, said rotor having at least one hydraulic cylinder in which a hydraulic piston can move in translation longitudinally in an alternating manner, moreover tightly so as to form with said cylinder a pump oil chamber of variable volume that can aspirate or deliver the fluid, said oil chamber being connected to the communication chamber by the female connector internal fluid duct or the male connector internal fluid duct via a pump delivery valve, the latter allowing the fluid to exit the pump oil chamber in order to pass into the communication chamber, but not the other way round, whereas the pump oil chamber also has a pump intake valve, which allows the fluid to enter said oil chamber, but not to exit therefrom.

The high-pressure rotating sealing coupling with continuous expandable ring according to the present invention comprises a male hydraulic connector, which is held centered in the female hydraulic connector and is hinged relative thereto by at least one connector bearing.

The high-pressure rotating sealing coupling with continuous expandable ring according to the present invention comprises a male connector internal fluid duct and/or a female connector internal fluid duct, which is connected to a connection body by means of at least one outer connection duct, which is secured by a first end to the male supply body or to the female supply body by means of a supply body tight ball joint and by a second end to the connection body by means of a connection body tight ball joint.

The high-pressure rotating sealing coupling with continuous expandable ring according to the present invention comprises a supply body tight ball joint and/or a connection body tight ball joint, which is formed in particular by a sealing ball carrier in the form of a truncated sphere located on the outer connection duct, said ball carrier resting on a sealing ball seat arranged either in the male supply body or in the female supply body with regard to the first end of the outer connection duct, or in the connection body with regard to the second end of said outer duct.

The high-pressure rotating sealing coupling with continuous expandable ring according to the present invention comprises a sealing ball carrier in the form of a truncated sphere, which is either mounted fixedly on the outer connection duct, or with the latter forms a tight sliding connection or a tight pivoting and sliding connection.

The high-pressure rotating sealing coupling with continuous expandable ring according to the present invention comprises a sealing ball carrier in the form of a truncated sphere, which is directly or indirectly held in contact with the sealing ball seat by a ball carrier spring.

The high-pressure rotating sealing coupling with continuous expandable ring according to the present invention comprises a longitudinal end of the non-expandable sealing ring, which is held in tight contact with the axial face on the non-expandable ring side, which has a hollowed or protruding truncated cone or truncated sphere profile.

BRIEF DESCRIPTION OF THE DRAWINGS

The following description with reference to the accompanying drawings, given by way of non-limiting example, will make it possible to better understand the invention, the features of the invention, and the advantages that can be provided thereby:

FIG. 5 is a cut-open three-dimensional view of the continuous expandable ring as may be provided for the high-pressure rotating sealing coupling with continuous expandable ring according to the invention, said view including a schematic sectional view showing in greater detail the cross section of said ring.

FIGS. 6, 7 and 8 illustrate the functioning of the high-pressure rotating sealing coupling with continuous expandable ring according to the invention when, respectively, subjected to a zero pressure, a medium pressure, and a strong pressure of the fluid, these figures illustrating more particularly the functioning of the continuous expandable ring when the expandable ring outer cylindrical face located on said expandable ring is intended to come into contact with the cylindrical female sealing section under the effect of the pressure of said fluid.

DESCRIPTION OF PREFERRED EMBODIMENTS

Figure 1:
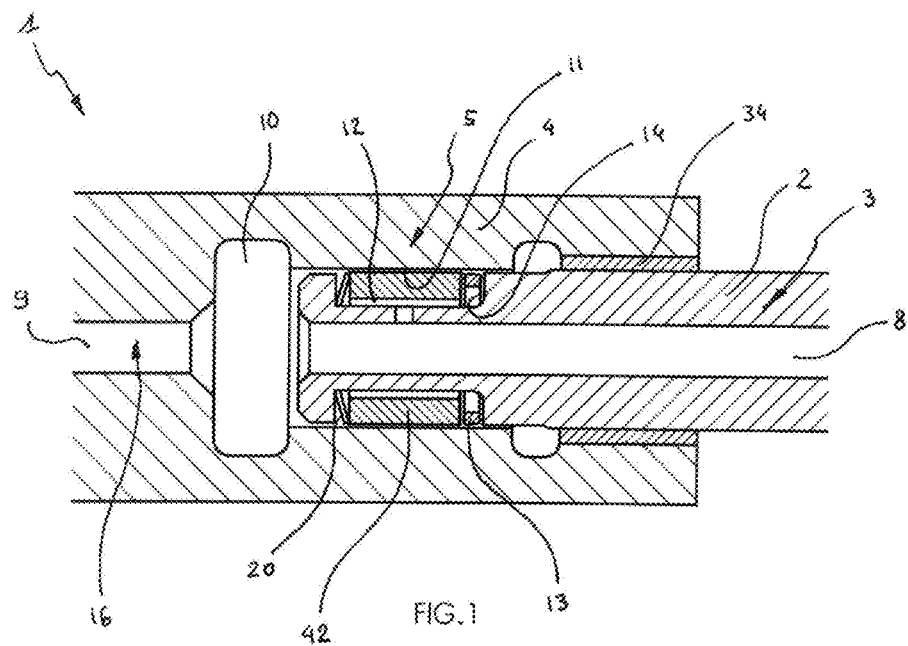
FIGS. 1 and 2 are respectively a schematic sectional view and a cut-open three-dimensional view of the high-pressure rotating sealing coupling with continuous expandable ring according to the invention in accordance with a variant in which the female connection face comprises a cylindrical female sealing section, in which the non-expandable sealing ring is accommodated with little play, as well as the continuous expandable ring, of which the expandable ring outer cylindrical face can come into contact over the entire outer circumference thereof with said female cylindrical portion under the effect of the pressure of the fluid.

FIGS. 1 to 12 show the high-pressure rotating sealing coupling with continuous expandable ring 1.

It can be seen, particularly in FIGS. 1 to 4 and 6 to 11, that the high-pressure rotating sealing coupling with continuous expandable ring 1 according to the invention comprises at least one male hydraulic connector 2 forming an integral part of a male supply body 3 and a female hydraulic connector 4, which forms an integral part of a female supply body 5, said connectors 2, 4 being coaxial whilst the male hydraulic connector 2 is accommodated within the female hydraulic connector 4 and can turn relative to the latter along a longitudinal axis common to both of the aforesaid connectors 2, 4, while the male hydraulic connector 2 has a male connection face 6 which faces a female connection face 7 located on the female hydraulic connector 4, said connection faces 6, 7 being shapes of revolution in principle.

Still with reference to FIGS. 1 to 4 and 6 to 11, it is noted that the high-pressure rotating sealing coupling with continuous expandable ring 1 according to the invention comprises at least one male connector internal fluid duct 8 arranged within the male hydraulic connector 2, in which duct a fluid 16 can circulate and of which one of the ends leads into a communication chamber 10 arranged in the female supply body 5 and/or the male supply body 3, whereas the other end of said internal duct 8 can lead out radially, axially or at any point of the male supply body 3.

The same figures also show that said sealing coupling 1 has at least one female connector internal fluid duct 9 arranged within the female hydraulic connector 4, in which duct the fluid 16 can circulate and of which one of the ends leads into the communication chamber 10, whereas the other end of said internal duct 9 can lead out radially, axially or at any point of the female body 4.

FIGS. 1 to 4 and 6 to 11 also clearly show that said sealing coupling 1 has at least one cylindrical female sealing section 11 arranged on the female connection face 7 and/or a cylindrical male sealing section 21 arranged on the male connection face 6.

It can also be seen in FIGS. 1 to 4 and 6 to 11 that the high-pressure rotating sealing coupling with continuous expandable ring 1 according to the invention has at least one non-expandable sealing ring 42, which is mounted around the male hydraulic connector 2 and which can slide along the latter, said ring 42 being accommodated with little play in the cylindrical female sealing section 11, and/or at least one non-expandable sealing ring 42 accommodated in the female hydraulic connector 4 and which can move in translation longitudinally within the latter, said ring 42 being mounted with little play around the cylindrical male sealing section 21.

Still with reference to the same figures and with the addition of FIG. 5 it can be seen that said sealing coupling 1 has at least one continuous expandable ring 13 of continuous annular form, inserted axially between the non-expandable sealing ring 42 and a ring annular bearing shoulder 14 arranged or connected on the male connection face 6 or on the female connection face 7, said continuous ring 13 comprising either an expandable ring inner cylindrical face 15 that can be subjected to the pressure of the fluid 16 contained in the communication chamber 10 via a pressure transmission channel 12 such that an expandable ring outer cylindrical face 17 located on said continuous ring 13 comes into contact over the entire outer circumference thereof with the cylindrical female sealing section 11, or an expandable ring outer cylindrical face 17 that can be subjected to the pressure of the fluid 16 contained in the communication chamber 10 via a pressure transmission channel 12 such that an expandable ring inner cylindrical face 15 located on said continuous ring 13 comes into contact over the entire inner circumference thereof with the cylindrical male sealing section 21, said continuous expandable ring 13 comprising an axial face on the non-expandable ring 18 side held directly or indirectly in tight contact with the non-expandable sealing ring 42 and an axial face on the bearing shoulder 19 side held directly or indirectly in tight contact with the ring annular bearing shoulder 14.

It is noted that the pressure transmission channel 12 can be arranged inside or outside the non-expandable sealing ring 42 and/or in the male supply body 3 or in the female supply body 5. It is also noted that the expandable ring inner cylindrical face 15 and/or the expandable ring outer cylindrical face 17 can cooperate with at least one circular sealing gasket made of flexible material in order to directly or indirectly produce a seal that is as tight as possible between the continuous expandable ring 13 and the non-expandable sealing ring 42 and/or the ring annular bearing shoulder 14.

Lastly, the high-pressure rotating sealing coupling with continuous expandable ring 1 according to the invention comprises at least one non-expandable ring spring 20 visible in FIGS. 1 to 4 and 6 to 11 and which tends to draw the non-expandable sealing ring 42 close to the ring annular bearing shoulder 14 and to axially compress the continuous expandable ring 13, said spring 20 possibly being one or more "Belleville" washers, a resilient washer of any type, or possibly being helical, a leaf spring, torsion spring, tension spring, compression spring, or any type of spring known to the person skilled in the art. It is also noted that said spring 20 may be a rotary form made of metal or any other material, of openwork design for example so as to allow the fluid 16 to pass through openings, or not of openwork design.

It is noted that the axial length portion of the expandable ring inner cylindrical face 15 closer to the ring annular bearing shoulder 14 may have on average a diameter smaller than the axial length portion of said cylindrical face 15 closer to the non-expandable sealing ring 42, whereas the expandable ring outer cylindrical face 17 may remain for its part approximately with the same diameter over the entire axial length thereof, moreover so that the continuous expandable ring 13 is radially thinner over the entire axial length thereof and is less steep from the side of the non-expandable sealing ring 42 than from the side of the ring annular bearing shoulder 14.

It should also be noted that the axial length portion of the expandable ring outer cylindrical face 17 closer to the ring annular bearing shoulder 14 may have on average a diameter greater than the axial length portion of said cylindrical face 17 closer to the non-expandable sealing ring 42, whereas the expandable ring inner cylindrical face 15 remains for its part approximately with the same diameter over the entire axial length thereof such that the continuous expandable ring 13 is radially thinner over the entire axial length thereof and is less steep from the side of the non-expandable sealing ring 42 than from the side of the ring annular bearing shoulder 14.

It can be clearly seen in FIG. 5 that an outer circumferential contact line 22 can be arranged in a protruding manner on the expandable ring outer cylindrical face 17, said line 22 being eccentric over the axial length of the continuous expandable ring 13 in the direction of the non-expandable sealing ring 42 such that a long slope of gradual incline 23 is formed from said line 2 oriented in the direction of the ring annular bearing shoulder 14, whereas a short slope of steep incline 24 is formed from said line 22 oriented in the direction of the non-expandable sealing ring 42.

Figure 3:
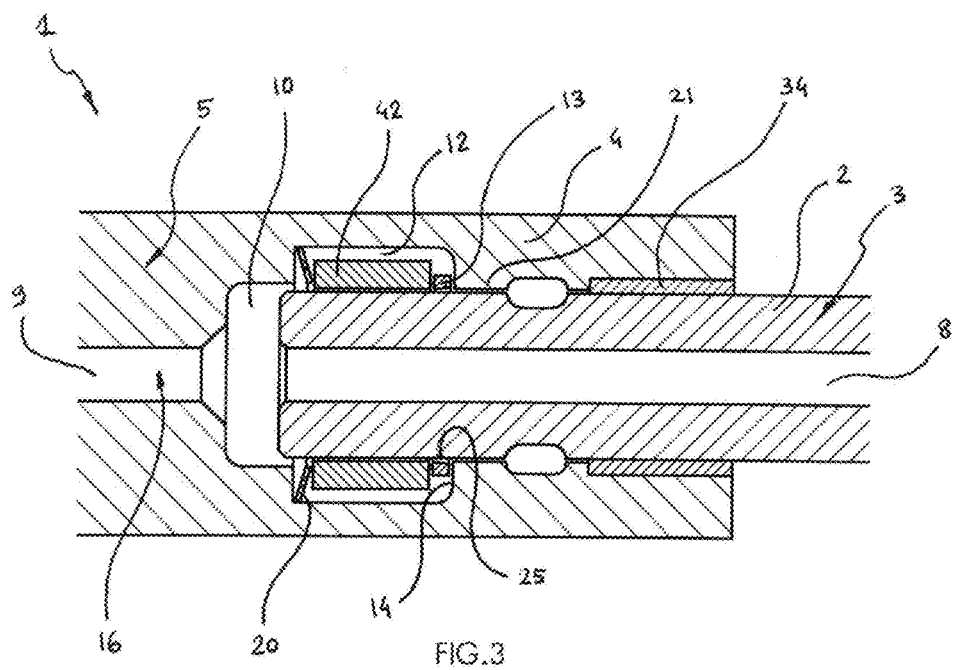
FIGS. 3 and 4 are respectively a schematic sectional view and a cut-open three-dimensional view of the high-pressure rotating sealing coupling with continuous expandable ring according to the invention in accordance with a variant in which the male connection face has a cylindrical male sealing section, around which the non-expandable sealing ring is accommodated with little play, as well as the continuous expandable ring, of which the expandable ring inner cylindrical face can come into contact over the entire inner circumference thereof with said cylindrical male section under the effect of the pressure of the fluid, said cut-open three-dimensional view including a schematic sectional view showing in greater detail the cross-section of the continuous expandable ring.
Figure 4:
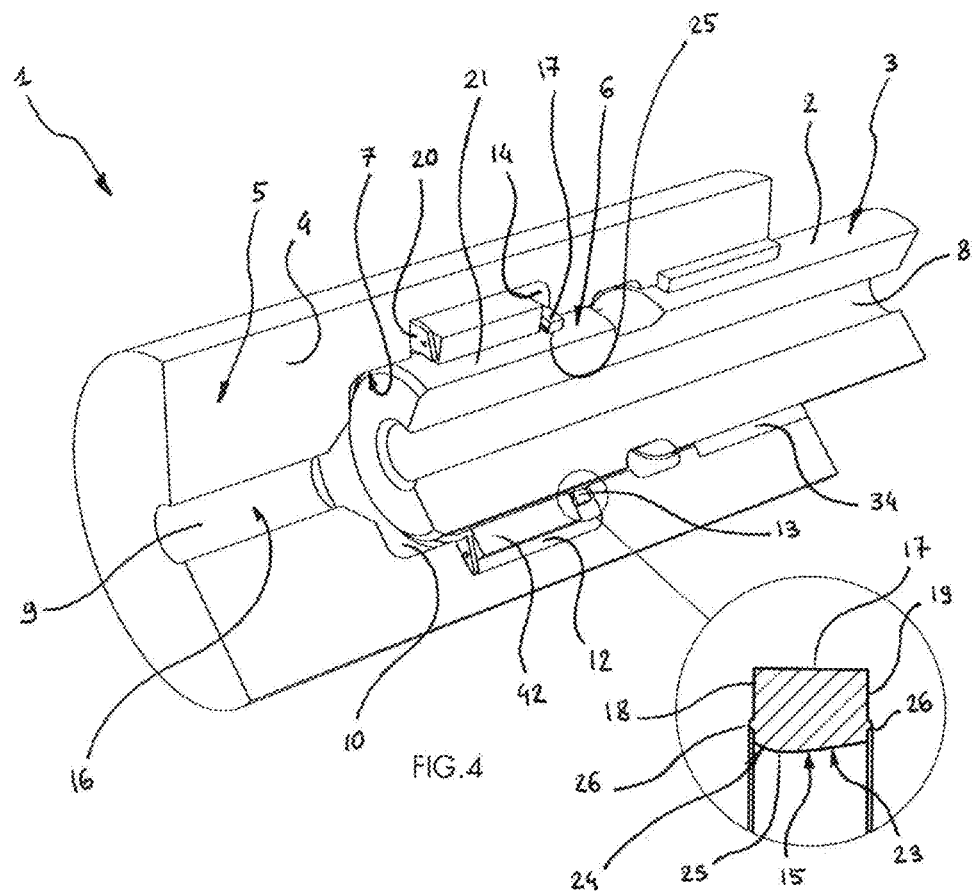

As an alternative shown in FIGS. 3 and 4, an inner circumferential contact line 25 can be arranged in a protruding manner on the expandable ring inner cylindrical face 15, said line 25 being eccentric along the axial length of the continuous expandable ring 13 in the direction of the non-expandable sealing ring 42 such that a long slope of gradual incline 23 is formed from said line 2 oriented in the direction of the ring annular bearing shoulder 14, whereas a short slope of steep incline 24 is formed from said line 22 oriented in the direction of the non-expandable sealing ring 42.

It can be noted here that the continuous expandable ring 3, the non-expandable sealing ring 42 or the ring annular bearing shoulder 14 can be wholly or partially nitrided, carburized and/or coated with DLC (diamond-like carbon) or with any other coating that is hard and/or has a low coefficient of friction.

It is additionally noted that the expandable ring outer cylindrical face 17 and/or the expandable ring inner cylindrical face 15 may have a domed profile as shown in FIG. 5, single sloping, double sloping, shouldered, of complex form or of any geometry applicable to segments in general and making it possible on the one hand to control the contact pressure between the expandable ring outer cylindrical face 17 and the cylindrical female sealing section 11 or between the expandable ring inner cylindrical face 15 and the cylindrical male sealing section 21, and making it possible on the other hand to control the thickness of the film of oil formed between said faces 17, 15 and said sections 11, 21, or the movements of torsion, of tilting or of bending of the continuous expandable ring 3.

FIG. 5 also shows that the non-expandable ring axial face 18 and/or the bearing shoulder axial face 19 may have an axial annular protrusion 26 making it possible to reduce the contact surface either between the axial face 18 on the non-expandable ring side and the non-expandable sealing ring 42, or between the axial face 19 on the bearing shoulder side and the ring annular bearing shoulder 14, or both, moreover in order to guarantee the best possible seal between these different components placed in contact with one another.

In addition, the profile of the expandable ring inner cylindrical face 15 or that of the expandable ring outer cylindrical face 17 can be provided in a beveled manner in order to allow the continuous expandable ring 13 to quickly retract under the effect of a balancing of the pressures to which said faces 15, 17 are subjected on either side of the line forming the contact thereof respectively with the cylindrical male sealing section 21 and with the cylindrical female sealing section 11.

FIGS. 9 to 12 show that, with the high-pressure rotating sealing coupling with continuous expandable ring 1 according to the invention, the female supply body 5 or the male supply body 3 may form a hydraulic pump rotor 27 for a hydraulic piston pump 32, said rotor 27 comprising at least one hydraulic cylinder 28 in which a hydraulic piston 29 can move in translation longitudinally in an alternating manner and tightly so as to form with said cylinder 28 a pump oil chamber 30 of variable volume that can aspirate or deliver the fluid 16, said oil chamber 30 being connected to the communication chamber 10 by the female connector internal fluid duct 9 or the male connector internal fluid duct 8 via a pump delivery valve 31, the latter allowing the fluid 16 to exit from the pump oil chamber 30 in order to pass into the communication chamber 10, but not the other way round, whereas the pump oil chamber 30 may also comprise a pump intake valve 33, which allows the fluid 16 to enter said oil chamber 30, but not to exit therefrom.

It is noted that the hydraulic cylinder 28 can be placed in the hydraulic pump rotor 27 radially, axially, tangentially or in any other orientation realizable by the person skilled in the art.

It is noted in FIGS. 1 to 4 and 9 to 11 that the male hydraulic connector 2 can be held centered in the female hydraulic connector 4 and hinged relative to the latter by at least one connector bearing 34, which may be a hydrodynamic or hydrostatic bearing, a ball bearing or roller bearing of any type, a gas or magnetic bearing, or any other bearing known to the person skilled in the art.

Figure 9:
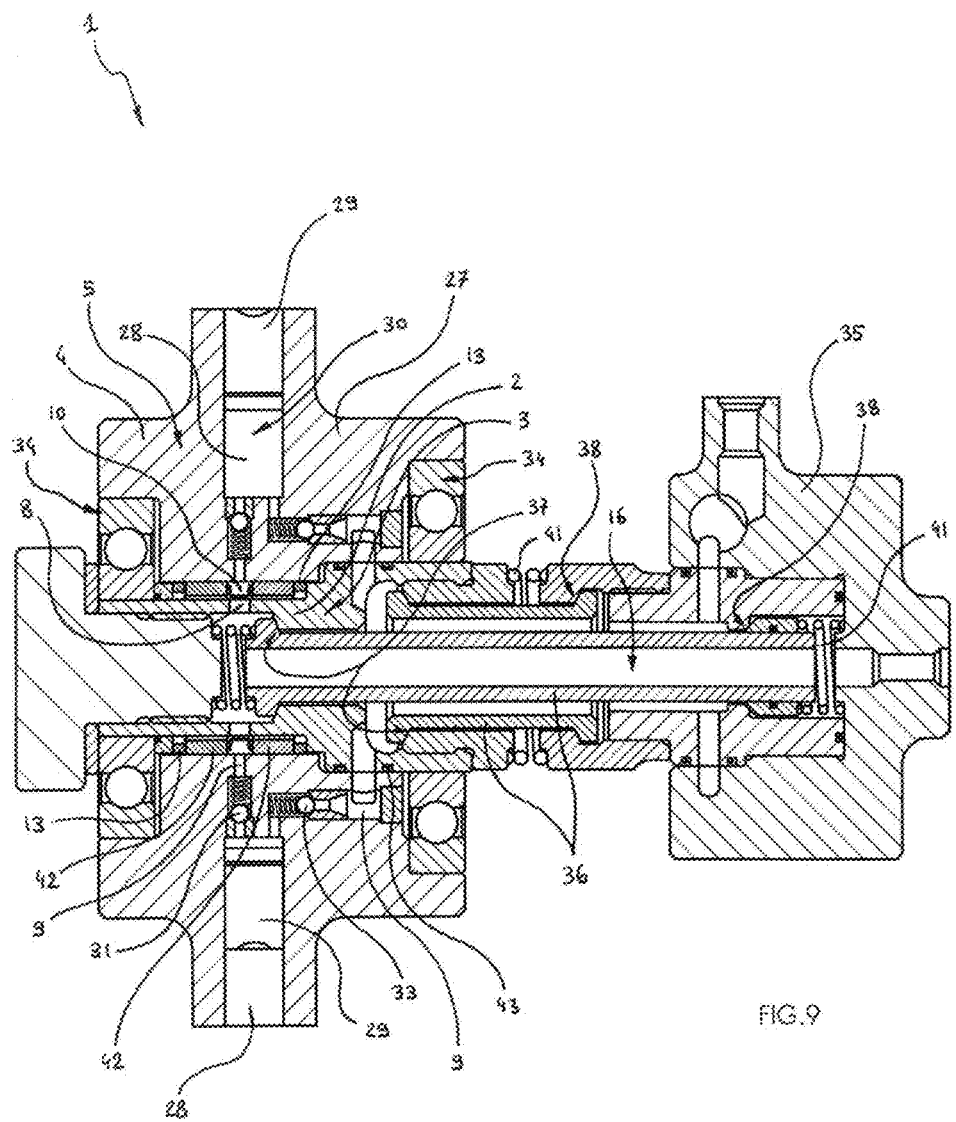
FIG. 9 is a schematic sectional view of a variant of the high-pressure rotating sealing coupling with continuous expandable ring according to the invention in accordance with which the female supply body forms a hydraulic pump rotor of a hydraulic piston pump, the male hydraulic connector comprising two male connector internal fluid ducts, while the female hydraulic connector comprises two female connector internal fluid ducts.
Figure 10:
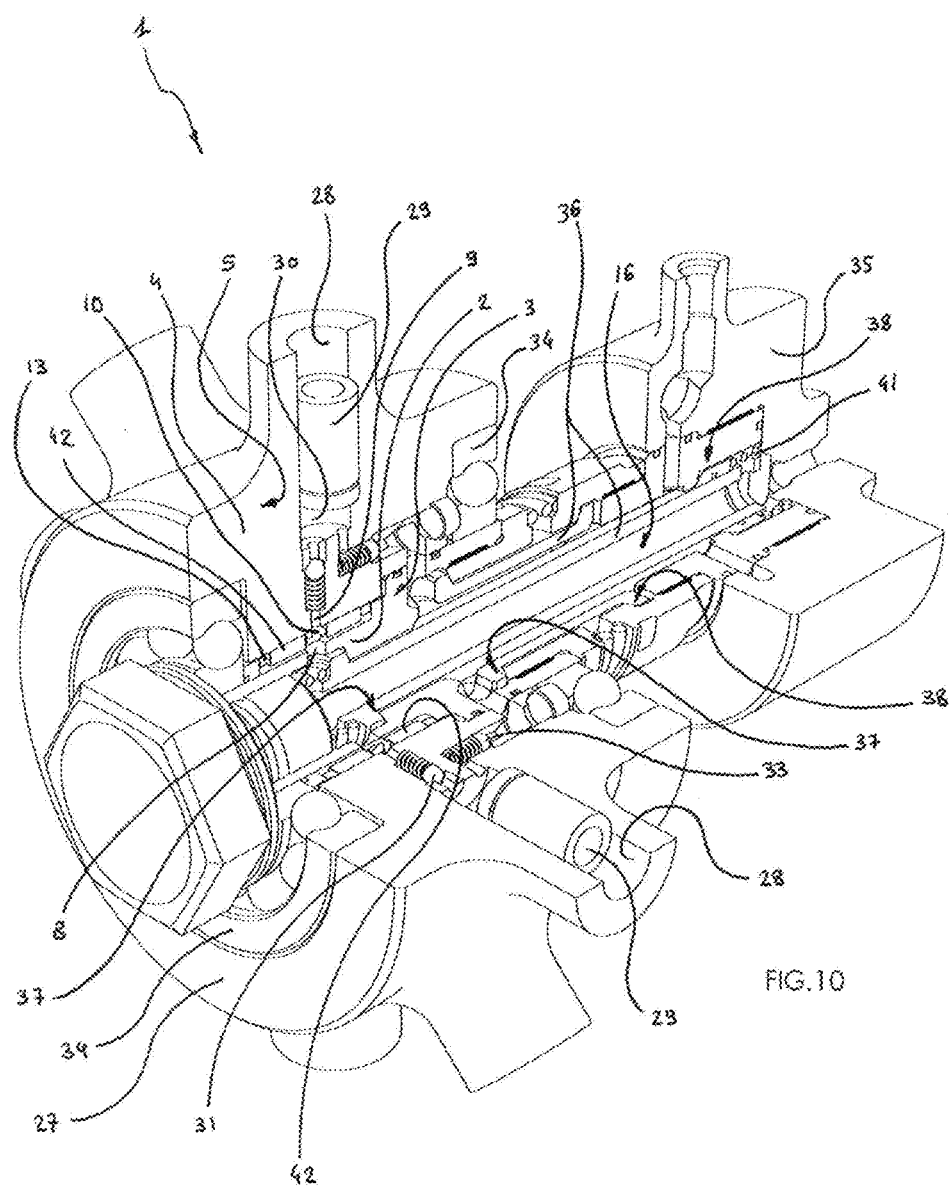
FIG. 10 is a cut-open three-dimensional view of the variant of the high-pressure rotating sealing coupling with continuous expandable ring according to the invention as illustrated in FIG. 8.
Figure 11:
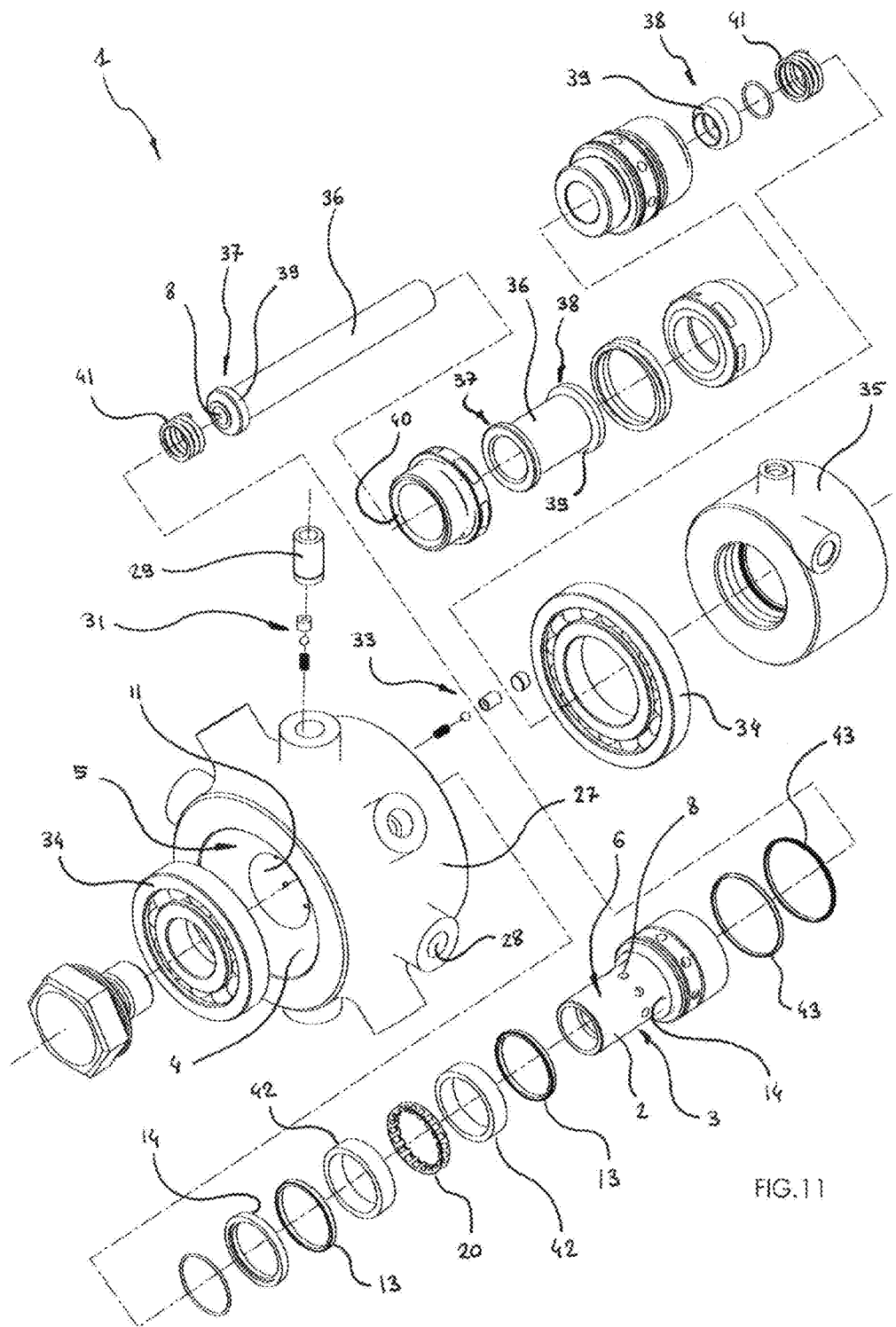
FIG. 11 is an exploded three-dimensional view of the variant of the high-pressure rotating sealing coupling with continuous expandable ring according to the invention as illustrated in FIG. 8.
Figure 12:
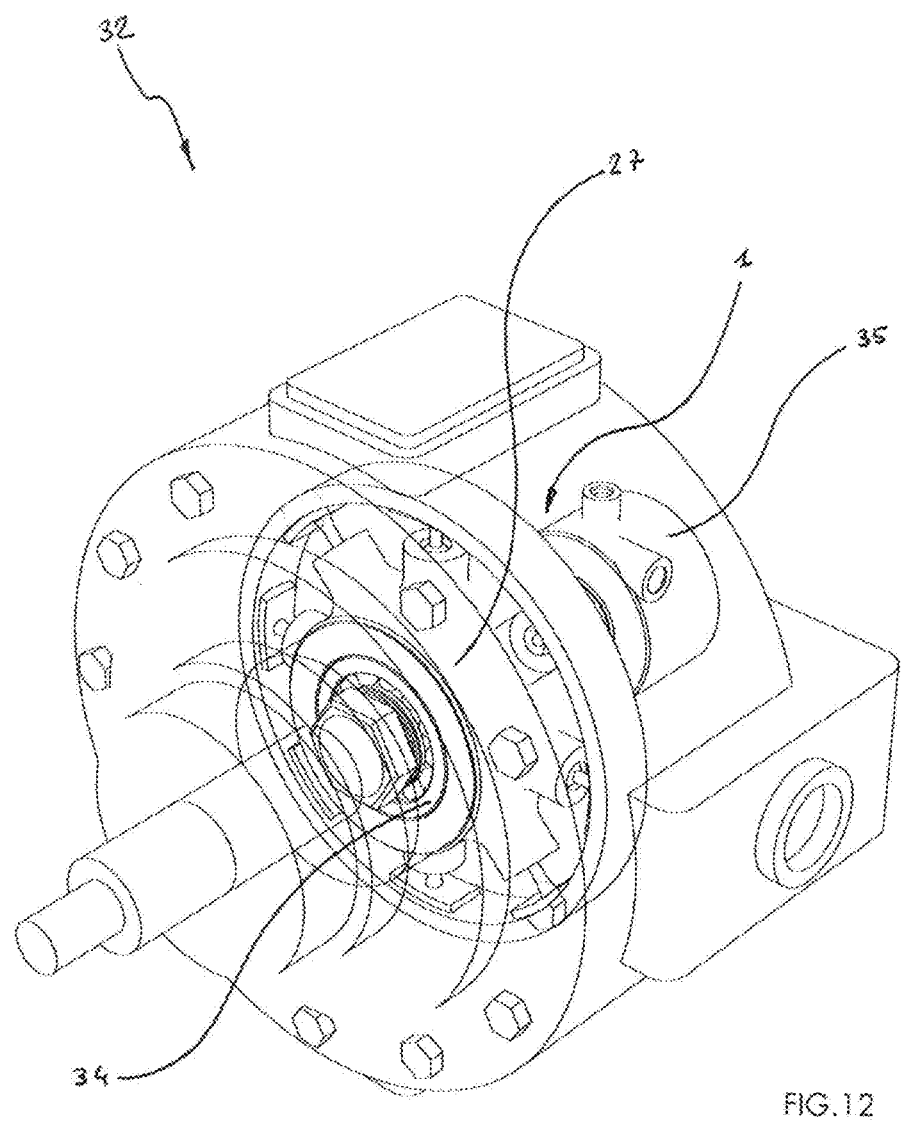
FIG. 12 is a transparent three-dimensional view of a hydraulic piston pump comprising the high-pressure rotating sealing coupling with continuous expandable ring according to the invention and in accordance with the variant illustrated in FIG. 8.

In FIGS. 9 to 11 it can be seen that the male connector internal fluid duct 8 and/or the female connector internal fluid duct 9 can be connected to a connection body 35 by means of at least one outer connection duct 36, which is secured by a first end to the male supply body 3 or to the female supply body 5 by means of a supply body tight ball joint 37 and by a second end to the connection body 35 by means of a connection body tight ball joint 38.

The same figures illustrate that the supply body tight ball joint 37 and/or the connection body tight ball joint 38 can be formed in particular of a sealing ball carrier in the form of a truncated sphere 39 located on the outer connection duct 36, said ball carrier 39 resting on a sealing ball seat 40 arranged either in the male supply body 3 or in the female supply body 5 with regard to the first end of the outer connection duct 36, or in the connection body 35 with regard to the second end of said outer duct 36.

Still with reference to FIGS. 9 to 11, it is noted that the sealing ball carrier in the form of a truncated sphere 39 can be either mounted fixedly on the outer connection duct 36, or may form with the latter a tight sliding connection or a tight pivoting and sliding connection such that said ball carrier 39 can slide along said duct 36.

It is noted that if the outer connection duct 36 comprises a sealing ball carrier in the form of a truncated sphere 39 mounted fixedly at each of the ends thereof, said outer duct 36 holds the connection body 35 at a constant distance with respect to the male supply body 3 or the female supply body 5 and in particular said outer duct 36 prevents the connection body 35 from moving away from the male supply body 3 or the female supply body 5 under the effect of the pressure of the fluid 16.

It can also be seen in FIGS. 9 to 11 that the sealing ball carrier in the form of a truncated sphere 39 can be held directly or indirectly in contact with the sealing ball seat 40 by a ball carrier spring 41, said spring 41 possibly being one or more "Belleville" washers, a resilient washer of any type, or possibly being helical, a leaf spring, torsion spring, tension spring, compression spring, or a spring of any type known to the person skilled in the art.

Lastly, it is noted that the longitudinal end of the non-expandable sealing ring 42 held in tight contact with the non-expandable ring axial face 18 may have a hollowed or protruding profile in the form of a truncated cone or truncated sphere, such that a slight axial misalignment between the non-expandable sealing ring 42 and the continuous expandable ring 13 cannot generate a leakage of fluid 16 at the interface between said continuous non-expandable sealing ring 42 and said expandable ring 13.

Functioning of the Invention:

The functioning of the high-pressure rotating sealing coupling with continuous expandable ring 1 according to the present invention is understood on the basis of the above description and with reference to FIGS. 1 to 12.

Figure 2:
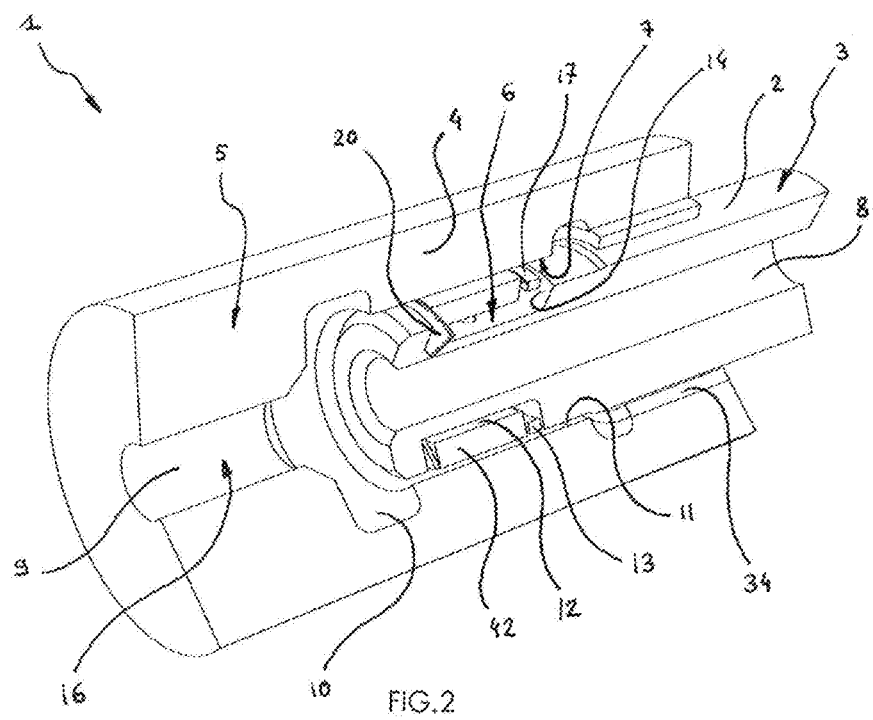

In order to illustrate the functioning of said coupling 1, the configuration shown in FIGS. 1 and 2 will be considered, in which the female connection face 7 has a cylindrical female sealing section 11 in which the non-expandable sealing ring 42 is accommodated with little play, as is the continuous expandable ring 13, the expandable ring outer cylindrical face 17 located on said continuous ring 13 being provided in order to be able to come into contact, under certain conditions, over the entire outer circumference thereof with said cylindrical female portion 11.

Still with reference to FIGS. 1 and 2, it is assumed that here a very highly pressurized fluid 16—pressurized at approximately 2000 bar—is to be sealed, the female supply body 5 rotating for example at a few hundred revolutions per minute whilst the male supply body 3 is held fixed. In accordance with the example illustrated in FIGS. 1 and 2, the rotating connection between the female supply body 5 and the male supply body 3 is formed by the connector bearing 34.

It is assumed that the pressurized fluid 16 arrives by the male supply body 3 via the male connector internal fluid duct 8, said fluid 16 then leading into the communication chamber 10 before leaving said communication chamber via the female connector internal fluid duct 9 located on the female supply body 5.

Here it is a question of ensuring—in spite of the elevated pressure of 2000 bar—a seal that is as tight as possible between the female supply body 5 and the male supply body 3, which rotate relative to one another, moreover with minimal frictional losses. Another objective is to guarantee said seal over the greatest possible number of revolutions, which may be counted in the hundreds of millions or even in billions.

In accordance with the non-limiting exemplary embodiment of the high-pressure rotating sealing coupling with continuous expandable ring 1 according to the invention shown in FIGS. 1 and 2, a continuous expandable ring 13 of configuration similar to that illustrated in FIG. 5 and shown schematically in section in FIGS. 6 to 8 has been selected. The last-mentioned figures make it possible to easily illustrate the functioning of said continuous ring 13, which cooperates with the non-expandable sealing ring 42.

FIG. 6 shows the state of the continuous expandable ring 13 when no pressure prevails in the male connector internal fluid duct 8, in the communication chamber 10, and in the female connector internal fluid duct 9.

It is noted in FIG. 6 that the continuous expandable ring 13 is held axially clamped between the non-expandable sealing ring 42 and the ring annular bearing shoulder 14 by the non-expandable ring spring 20. Since the continuous expandable ring 13 has an axial annular protrusion 26 on its axial face on the non-expandable ring side 18 and on its axial face on the bearing shoulder side 19, a relatively tight axial seal is produced between said continuous ring 13 and the non-expandable sealing ring 42 on the one hand and between said continuous ring 13 and the annular ring bearing shoulder 14 on the other hand.

Said tight seal originates in particular from the force exerted axially by the non-expandable ring spring 20 onto the continuous expandable ring 13. This force is moderate and yet the pressure of the contact between the axial annular protrusion 26 and the non-expandable sealing ring 42 on the one hand and the ring annular bearing shoulder 14 on the other hand is elevated given the small contact surface provided by said protrusion 26. It is this elevated contact pressure that guarantees said tight seal.

Still with reference to FIG. 6 it can be seen that a small radial play is left between the non-expandable sealing ring 42 and the cylindrical female sealing section 11. This play may be, in practice, a few microns. It is noted that a radial play of this same magnitude is left between the continuous expandable ring 13 and said cylindrical portion 11. It is also noted that the non-expandable sealing ring 42 and the continuous expandable ring 13 are guided radially solely by the cylindrical female sealing section 11.

FIG. 7 illustrates what happens when the high-pressure rotating sealing coupling with continuous expandable ring 1 according to the invention is subjected to a median intermediate pressure, for example of 1000 bar.

The pressure prevailing in the communication chamber 10 is established instantaneously in the pressure transmission channel 12, such that the expandable ring inner cylindrical face 15 is also instantaneously subjected to said pressure by means of the fluid 16.

Parallel thereto, the slight radial play left between the non-expandable sealing ring 42 and the cylindrical female sealing section 11 induces a drop of pressure of the fluid 16, which is all the more significant in view of the fact that the latter is provided under pressure in the gap between said sealing ring 42 and said cylindrical section 11. The pressure above the expandable ring outer cylindrical face 17 is then close to atmospheric pressure.

This results in a high difference of pressure between the expandable ring inner cylindrical face 15 and the expandable ring outer cylindrical face 17. This pressure difference increases the diameter of the continuous expandable ring 13, the latter being made of steel, which, by nature, is resilient.

The diameter of the continuous expandable ring 13 therefore increases until the outer circumferential contact line 22 of the expandable ring outer cylindrical face 17 of said ring 13 comes into contact with the cylindrical female sealing section 11, which provides a seal between said line 22 and said section 11. Once this contact has been established, there is no longer any passage for the fluid 16 to escape from the high-pressure rotating sealing coupling with continuous expandable ring 1 according to the invention.

It is understood that the force exerted at the point of contact between the outer circumferential contact line 22 and the cylindrical female sealing section 11 results from the force exerted by the fluid 16 on the expandable ring inner cylindrical face 15 minus the force of constriction of the continuous expandable ring 13 resulting from the stiffness thereof, said stiffness translating the resistance into the deformation of said ring 13.

It is noted in FIG. 5 that the profile of the continuous expandable ring 13 has a long slope of gradual incline 23 intended to be oriented in the direction of the ring annular bearing shoulder 14 and a short slope of steep incline 24 envisaged to be oriented in the direction of the non-expandable sealing ring 42, whereas the outer circumferential contact line 22 is approximately located at the junction of these two aforesaid slopes 23, 24.

This particular configuration makes it possible to expose a sufficient section to the pressure of the fluid 16 so that the continuous expandable ring 13 remains in diametrical expansion in spite of the contact established between the outer circumferential contact line 22 and the cylindrical female sealing section 11.

In FIG. 8 the situation as encountered when the pressure of the fluid 16 has reached, for example, 2000 bar is shown. Under such a pressure, the longitudinal section of the continuous expandable ring 13 exposed to said pressure by the long slope of gradual incline 23 tends to cause the continuous expandable ring 13 to tilt over the transverse section thereof. This reduces the longitudinal section exposed by the continuous expandable ring 13 to the pressure, thus reducing the extra force applied by the outer circumferential contact line 22 on the cylindrical female sealing section 11, said extra force being useless for reaching the sought level of seal. In fact, by pivoting thereon, the transverse section of the continuous expandable ring 13 tends to reduce the effective length of the long slope of gradual incline 23 and therefore the effective longitudinal section of the continuous expandable ring 13 exposed to the pressure of the fluid 16.

It can be noted that, in accordance with this exemplary arrangement provided by the high-pressure rotating sealing coupling with continuous expandable ring 1 according to the invention, it is possible to calculate the cross-sectional profile of the continuous expandable ring 13 in order to find, whatever the pressure of the fluid 16 contained in the communication chamber 10, the best compromise possible between seal, contact pressure and contact force.

This makes it possible to minimize the frictional losses occurring at the point of contact between the outer circumferential contact line 22 and the cylindrical female sealing section 11, whilst maintaining the seal at the sought level.

It is also noted that, because the continuous expandable ring 13 is metal, it is naturally resistant to abrasion and can assure a durable service of constant quality, provided that the fluid 16 is not too highly corrosive and/or abrasive. In order to further improve its resistance to abrasion and its energy efficiency, said continuous ring 13 can be wholly or partially nitrided, carburized and/or coated with DLC (diamond-like carbon) or with any other coating that is hard and/or has a low coefficient of friction. Said continuous ring 13 may also receive an anticorrosion treatment—in accordance with some applications.

FIGS. 9 to 12 show the high-pressure rotating sealing coupling with continuous expandable ring 1 in accordance with the invention used in a hydraulic piston pump 32 equipped with hydraulic pistons 29 placed radially in a hydraulic pump rotor 27 forming the female supply body 5.

It can be seen in this case that the high-pressure rotating sealing coupling with continuous expandable ring 1 according to the invention contributes to the provision of a hydraulic piston pump 32 of high energy performance, because it has no significant leakage of fluid 16 at said coupling 1.

In accordance with this example a pressure of approximately 2000 bar may also be provided to seal between the female supply body 5 and the male supply body 3, whereas two continuous expandable rings 13 and two non-expandable sealing rings 42 mounted axially symmetrically on either side of a non-expandable ring spring 20 common to the two non-expandable sealing rings 42 are provided.

It can be noted that the high-pressure rotating sealing coupling with continuous expandable ring 1 according to the invention cooperates with lip gaskets 43, which ensure the rotating seal from the low-pressure supply inlet of the hydraulic pump 27.

Still with reference to this example, the high-pressure rotating sealing coupling with continuous expandable ring 1 comprises two connector bearings 34 taking the form of ball bearings.

It is noted that the low-pressure intake of fluid 16 of each hydraulic cylinder 28 of the hydraulic pump 27 works by means of a pump intake valve 33, whereas said fluid 16 is expelled from said cylinders by a pump delivery valve 31.

Thus, the hydraulic pump 27 behaves as a freewheel and naturally recovers almost all the compressibility energy of the fluid 16, which contributes greatly to the high energy performance of said pump.

It is noted that the male supply body 3 is connected to a connection body 35 mounted fixedly in relation to the hydraulic piston pump 32 by means of outer connection ducts 36, the smaller being dedicated to high pressure, whereas the larger is dedicated to low pressure.

It is noted that the outer connection ducts 36 are terminated by a supply body tight ball joint 37 on the side of the hydraulic pump 27, and by a connection body tight ball joint 38 on the side of the connection body 35. This particular configuration allows micro movements in all directions and in all directions of rotation between the male supply body 3 and the connection body 35, such a freedom being made necessary by the deformations under load, the inaccuracies of machining, and the operating clearances to which the hydraulic piston pump 32 is exposed.

It is noted that the two sealing ball carriers in the form of a truncated sphere 39 of the outer connection duct 36 dedicated to low pressure are mounted fixedly on said duct 36 so as to hold the connection body 35 at a constant distance in relation to the male supply body 3 in spite of the force generated by the pressure of the fluid 16. In addition, it is noted that the sealing ball carrier in the form of a truncated sphere 39 of the outer connection duct 36 dedicated to the high pressure placed on the side of the male connection body 3 is mounted fixedly on said duct 36, whereas the opposite sealing ball carrier in the form of a truncated sphere 39 mounted on the same duct 36 forms a pivoting and sliding connection with the latter.

These exemplary applications of the high-pressure rotating sealing connection with continuous expandable ring 1 allow simple transposition of the use thereof to other applications, whether these concern hydraulic pumps or any other machine, without limitation. Said other applications, with said coupling 1 according to the invention, can thus find a solution to prevent any significant leakage of liquid or gaseous fluid between two parts that rotate continuously or in alternation relative to one another.

It must be understood that the above description has been given merely by way of example and in no way limits the scope of the invention, which will not be departed from with replacement of the described execution details with any other equivalent.

The invention claimed is:

1. A high-pressure rotating sealing coupling with a continuous expandable ring (1), comprising:
    at least one male hydraulic connector (2) forming an integral part of a male supply body (3), or at least one female hydraulic connector (4), which forms an integral part of a female supply body (5), said connectors (2, 4) being coaxial whilst the male hydraulic connector (2) is accommodated within the female hydraulic connector (4) and can rotate relative to the female hydraulic connector (4) along a longitudinal axis common to the two aforesaid connectors (2, 4), while the male hydraulic connector (2) has a male connection face (6) which faces a female connection face (7) located on the female hydraulic connector (4), said connection faces (6, 7) being shapes of revolution;
    at least one male connector internal fluid duct (8) arranged inside the male hydraulic connector (2), in which duct a fluid (16) can circulate and of which one end leads into a communication chamber (10) arranged in the female supply body (5) or the male supply body (3);
    at least one female connector internal fluid duct (9) arranged inside the female hydraulic connector (4), in which duct the fluid (16) can circulate and of which one end leads into the communication chamber (10);
    at least one female cylindrical sealing section (11) arranged in the female connection face (7), or a male cylindrical sealing section (21) arranged on the male connection face (6);
    at least one non-expandable sealing ring (42) mounted around the male hydraulic connector (2) and which can slide along the male hydraulic connector (2), said ring (42) being accommodated with little play in the cylindrical female sealing section (11), or at least one non-expandable sealing ring (42) accommodated in the female hydraulic connector (4) and which can move in translation longitudinally within the female hydraulic connector (4), said ring (42) being mounted with little play around the cylindrical male sealing section (21);
    at least one continuous expandable ring (13) of continuous annular form, inserted axially between the non-expandable sealing ring (42) and a ring annular bearing shoulder (14) arranged or connected on the male connection face (6) or on the female connection face (7), said continuous ring (13) comprising either an expandable ring inner cylindrical face (15) that can be subjected to the pressure of the fluid (16) contained in the communication chamber (10) via a pressure transmission channel (12) such that an expandable ring outer cylindrical face (17) located on said continuous ring (13) comes into contact over the entire outer circumference thereof with the cylindrical female sealing section (11), or an expandable ring outer cylindrical face (17) that can be subjected to the pressure of the fluid (16) contained in the communication chamber (10) via a pressure transmission channel (12) such that an expandable ring inner cylindrical face (15) located on said continuous ring (13) comes into contact over the entire inner circumference thereof with the cylindrical male sealing section (21), said continuous expandable ring (13) comprising an axial face on a non-expandable ring (18) side held directly or indirectly in tight contact with the non-expandable sealing ring (42), and an axial face on a bearing shoulder (19) side held directly or indirectly in tight contact with the ring annular bearing shoulder (14); and
    at least one non-expandable ring spring (20), which tends to draw the non-expandable sealing ring (42) close to the ring annular bearing shoulder (14) and to axially compress the continuous expandable ring (13).

2. The sealing coupling according to claim 1, wherein an axial length portion of the expandable ring inner cylindrical face (15) closer to the ring annular bearing shoulder (14) on average has a diameter smaller than an axial length portion of said cylindrical face (15) closer to the non-expandable sealing ring (42), whereas the expandable ring outer cylindrical face (17) has approximately a same diameter over an entire axial length thereof.

3. The sealing coupling according to claim 1, wherein an axial length portion of the expandable ring outer cylindrical face (17) closer to the ring annular bearing shoulder (14) on average has a diameter greater than an axial length portion of said cylindrical face (17) closer to the non-expandable sealing ring (42), whereas the expandable ring inner cylindrical face (15) has approximately a same diameter over a entire axial length thereof.

4. The sealing coupling according to claim 1, wherein an outer circumferential contact line (22) is arranged in a protruding manner on the expandable ring outer cylindrical face (17), said line (22) being eccentric over the axial length of the continuous expandable ring (13) in the direction of the non-expandable sealing ring (42), such that a long slope of gradual incline (23) is formed from said line (2) oriented in the direction of the ring annular bearing shoulder (14), whereas a short slope of steep incline (24) is formed from said line (22) oriented in the direction of the non-expandable sealing ring (42).

5. The sealing coupling according to claim 1, wherein an inner circumferential contact line (25) is arranged in a protruding manner on the expandable ring inner cylindrical face (15), said line (25) being eccentric over the axial length of the continuous expandable ring (13) in the direction of the non-expandable sealing ring (42), such that a long slope of gradual incline (23) is formed from said line (2) oriented in the direction of the ring annular bearing shoulder (14), whereas a short slope of steep incline (24) is formed from said line (22) oriented in the direction of the non-expandable sealing ring (42).

6. The sealing coupling according to claim 1, wherein the axial face on the non-expandable ring (18) side or the axial face on the bearing shoulder (19) side comprises an axial annular protrusion (26).

7. The sealing coupling according to claim 1, wherein the female supply body (5) or the male supply body (3) forms a hydraulic pump rotor (27) for a hydraulic piston pump (32), said rotor (27) comprising at least one hydraulic cylinder in which a hydraulic piston (29) can move in translation longitudinally in an alternating manner, tightly so as to form with said cylinder (28) a pump oil chamber (30) of variable volume that can aspirate or deliver the fluid (16), said oil chamber (30) being connected to the communication chamber (10) by the female connector internal fluid duct (9) or the male connector internal fluid duct (8) via a pump delivery valve (31), the pump delivery valve (31) allowing the fluid (16) to exit the pump oil chamber (30) in order to pass into the communication chamber (10), but not the other way round, whereas the pump oil chamber (30) also has a pump intake valve (33), which allows the fluid (16) to enter said oil chamber (30), but not to exit therefrom.

8. The sealing coupling according to claim 1, wherein the male hydraulic connector (2) is held centered in the female hydraulic connector (4) and is hinged relative thereto by at least one connector bearing (34).

9. The sealing coupling according to claim 1, wherein the male connector internal fluid duct (8) or the female connector internal fluid duct (9) is connected to a connection body (35) by means of at least one outer connection duct (36), which is secured by a first end to the male supply body (3) or to the female supply body (5) by means of a supply body tight ball joint (37) and by a second end to the connection body (35) by means of a connection body tight ball joint (38).

10. The sealing coupling according to claim 9, wherein the supply body tight ball joint (37) or the connection body tight ball joint (38) is formed by a sealing ball carrier in the form of a truncated sphere (39) located on the outer connection duct (36), said ball carrier (39) resting on a sealing ball seat (40) arranged either in the male supply body (3) or in the female supply body (5) with regard to the first end of the outer connection duct (36) or in the connection body (35) with regard to the second end of said outer duct (36).

11. The sealing coupling according to claim 10, wherein the sealing ball carrier in the form of the truncated sphere (39) is either mounted fixedly on the outer connection duct (36), or with the outer connection duct (36) forms a tight sliding connection or a tight pivoting and sliding connection.

12. The sealing coupling according to claim 10, wherein the sealing ball carrier in the form of a truncated sphere (39) is directly or indirectly held in contact with the sealing ball seat (40) by a ball carrier spring (41).

13. The sealing coupling according to claim 1, wherein a longitudinal end of the non-expandable sealing ring (42), which is held in tight contact with the axial face on the non-expandable ring (18) side has a protruding truncated cone or truncated sphere profile.

* * * * *